United States Patent [19]

Maskalick

[11] 4,337,124
[45] Jun. 29, 1982

[54] NON-PULSED ELECTROCHEMICAL IMPREGNATION OF FLEXIBLE METALLIC BATTERY PLAQUES

[75] Inventor: Nicholas J. Maskalick, Pittsburgh, Pa.

[73] Assignee: Westinghouse Electric Corp., Pittsburgh, Pa.

[21] Appl. No.: 292,976

[22] Filed: Aug. 14, 1981

[51] Int. Cl.³ .................. H01M 4/04; C25D 11/00
[52] U.S. Cl. .................................... 204/2.1; 204/56 R
[58] Field of Search .................... 204/2.1, 56 R, 24

[56] References Cited

U.S. PATENT DOCUMENTS 3,214,355 10/1965 Kandler ............................ 204/56 R
3,600,227 8/1971 Hardman ............................ 204/2.1

Primary Examiner—T. M. Tufariello
Attorney, Agent, or Firm—D. P. Cillo

[57] ABSTRACT

A method of loading active battery material into porous, flexible, metallic battery plaques, comprises the following steps: precipitating nickel hydroxide active material within the plaque, by making the plaque cathodic, at a high current density, in an electro-precipitation cell also containing a consumable nickel anode and a solution comprising nickel nitrate, having a pH of between 2.0 and 2.8; electrochemically oxidizing the precipitate in caustic formation solution; and repeating the electro-precipitation step at a low current density.

10 Claims, 3 Drawing Figures

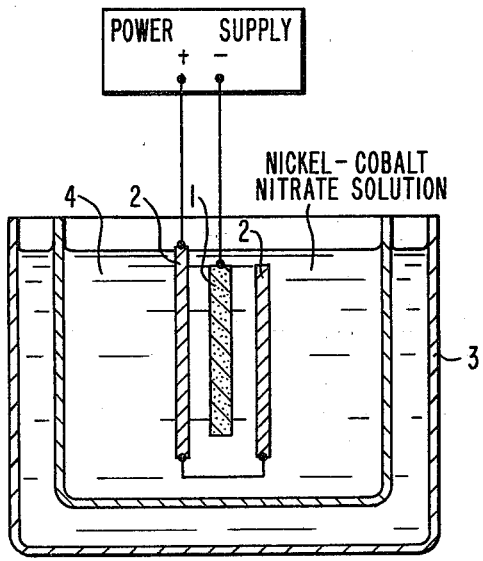
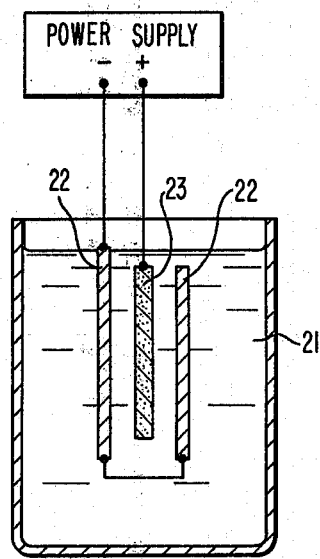
FIG. 1 — ELECTRO-PRECIPITATION
FIG. 2 — CHARGING FORMATION
FIG. 3 ic impregnation of active battery material into electrode plaques. This process fills a rigid, sintered metallic powder plaque with active material by immersion in a 10% concentrated nickel nitrate solution, having a pH of 3, and electrolytic deposition of nickel hydroxide active material at a current density of about 1 milliampere (mA.)/sq.cm. After drying to reduce nickel hydroxide active material volume, cathodic polarization can be repeated. This process, however, is difficult to use with thick battery plaques. The electrodes produced by this process have an indicated capacity of 1 to 1.5 ampere-hours (Ah.)/sq. decimeter for plaque thicknesses of 0.65 mm.

NON-PULSED ELECTROCHEMICAL IMPREGNATION OF FLEXIBLE METALLIC BATTERY PLAQUES

GOVERNMENT CONTRACT

This invention was made or conceived in the course of or under Contract No. W-31-109-38-4141 with the U.S. Government as represented by the U.S. Department of Energy.

BACKGROUND OF THE INVENTION

Kandler, in U.S. Pat. No. 3,214,355, teaches electrochemical impregnation of active battery material into electrode plaques. This process fills a rigid, sintered metallic powder plaque with active material by immersion in a 10% concentrated nickel nitrate solution, having a pH of 3, and electrolytic deposition of nickel hydroxide active material at a current density of about 1 milliampere (mA.)/sq.cm. After drying to reduce nickel hydroxide active material volume, cathodic polarization can be repeated. This process, however, is difficult to use with thick battery plaques. The electrodes produced by this process have an indicated capacity of 1 to 1.5 ampere-hours (Ah.)/sq. decimeter for plaque thicknesses of 0.65 mm.

Hardman, in U.S. Pat. No. 3,600,227, solved problems of thick plaque impregnation, and provided improved electrode capacity by using higher current densities during electrolytic deposition, preferably coupled with a current pulsing action, followed by an intermediate charging and discharging step. Hardman utilized expansible metal fiber plaques, and a saturated nickel-cobalt nitrate electrolyte solution having a pH of between 0.5 and 1.1. A series of current pulses was preferably used after the plaque was immersed in the nitrate electrolyte. Intermediate charging and discharging was used to form Ni(III) hydroxide, Ni(II) hydroxide, and finally Ni(III) hydroxide. This caused volume changes in the hydroxide active material, which opened up more pore volume in the expansible plaque. Further electrolytic deposition was then carried out at a current density of from about 20 to 100 mA./sq.cm. While this provided a capacity of about 5.7 to 7.1 ampere-hours/sq. decimeter or 0.37 to 0.46 ampere-hours/sq. inch of plaque area for a plaque thickness of 1.9 mm., some corrosion and metallic fiber dissolution problems were occassionally encountered. What is needed is a process to highly load thick battery plaques without corrosion and dissolution problems, in order to consistently yield high performance electrode plates.

SUMMARY OF THE INVENTION

The above need has been met by providing a non-pulsed electrochemical impregnation method, utilizing an electrolyte having a pH of between 2.0 and 2.8, followed by intermediate electrical charging without intermediate electrical discharging, and concluding with additional non-pulsed electrochemical impregnation at a low current density of between about 2 mA./sq.cm. and 10 mA./sq.cm.

More specifically, the method consists of: (1) Immersing flexible, expansible, bonded nickel or nickel coated metal fiber plaques, about 2.0 mm thick and about 90 percent porous, and a consumable nickel electrode into a nickel nitrate-cobalt nitrate electrolyte solution having a pH of between 2.0 and 2.8, and a temperature of below about 30° C. (2) Making the expansible fiber plaque cathodic, by a non-pulsed, continuous application of direct current, at a current density of between about 20 mA./sq.cm. and 100 mA./sq.cm., and the consumable nickel electrode anodic, to cause a precipitate build, within the plaque, comprising $Ni(OH)_2$ and minor amounts of $Co(OH)_2$. The loaded plaques are then washed. (3) Intermediate electrical charging of the plaque, containing the precipitate, in alkaline hydroxide solution. This causes the precipitated nickel hydroxide to be oxidized, with a resulting change in volume. This is effective to open up unfilled pores in the flexible, expansible plaque through active material compacting against and between the flexible nickel fibers of the plaque. A discharging step is not used. The loaded plaques are then washed (4) Step (2) is then repeated in the nickel-cobalt electrolyte solution, but at a lower non-pulsed, continuous current application at a current density of between about 2.0 mA./sq.cm. and 10.0 mA./sq.cm. (5) The plaques preferably then undergo a final electrical charging step.

This method employs a non-pulsed high initial direct current followed by low, subsequent, non-pulsed direct current in a moderately acidic electrolyte. Thus, during electro-precipitation, the localized electrolyte within the porous plaque quickly reaches a pH of about 7.5, at which point $Ni(OH)_2$ can precipitate in situ. This pH within the plaque is maintained by continuous application of direct current, so that the localized electrolyte does not become acidic enough to corrode and dissolve any part of the plaque.

BRIEF DESCRIPTION OF THE DRAWINGS

For a better understanding of the nature and objects of the invention reference may be made to the preferred embodiments exemplary of the invention, shown in the accompanying drawings, in which:

FIG. 1 shows the electro-precipitation apparatus;

FIG. 2 shows the intermediate charging apparatus; and

FIG. 3 shows a flow chart of the method of loading active material in this invention.

DESCRIPTION OF THE PREFERRED EMBODIMENTS

It was found that optimized nickel electrodes for use in my process are possible through careful processing of a bonded metallic fiber skeleton, such as that diclosed in U.S. Pat. No. 3,895,960, herein incorporated by reference. For maximum loading of battery active material, the diameter of the fibers of the plaques must be between about 0.0002 inch and 0.003 inch, and plaque porosity must be between about 75 and 95 percent, i.e. plaque densities falling between 5 and 25 percent of theoretical density.

Generally, the flexible plaque will be composed of fibers such as nickel fibers or nickel plated, bonded steel wool fibers. These fibers are pressed and metallurgically bonded together at many points along their length to give a plaque having flat, planar surface areas. One edge will usually be coined to a density of about 90 percent, to provide a base for spot welded nickel or nickel plated steel strips which become the electrical lead-tabs for loaded battery plates.

Referring now to FIG. 1 of the drawings, the flexible metallic plaques are inserted into the electro-precipitation cell shown. The cell contains an aqueous solution 4 of $Ni(NO_3)_2.6H_2O$ and $Co(NO_3)_2.6H_2O$ having a ratio of about 20 parts by weight nickel nitrate to 1 part cobalt nitrate. This electrolyte solution is preferably about 50% to about 83% concentrated, on a hydrated basis, having a specific gravity of about 1.50 to 1.60 and a pH of between 2.0 and 2.8. A pH within this range will still be effective to clean any initial oxide on the plaque fibers and to help anodically dissolve the consumable anode.

A pH below about 2.0 in the electrolyte solution can result in fiber corrosion. A pH over 2.8, will result in a highly undesirable precipitate scale formation on the outside of the plaque. Below about 50% concentration, current efficiency begins to suffer because there are not enough nickel ions in the plaque during electro-precipitation to take advantage of the electrically generated $OH^-$ precipitating agent. Around 85% concentration, the nickel nitrate salt starts to crystallize at the operating temperature of the cell, below about 30° C. The cobalt salt in the electrolyte solution is not necessary for the process, but is added in minor amounts to improve utilization of the active material, and to improve the efficiency of charging the active material.

As shown in FIG. 1, a consumable nickel anode 2 is used on both sides of the fiber plaque 1, and placed close to the flat planar surface of the expansible plaque to minimize voltage requirements. This anode can be electrolytically deposited nickel, or other type, such as sulfur depolarized nickel, or nickel chips. The former is about 70% consumed and the latter two about 90% consumed during the process. Such a consumable anode is an economical and preferred means of replenishing nickel.

The metal fiber plaque 1 should be lowered slowly into the electrolyte bath, so as to minimize the amount of air trapped in the pore area of the plaque. Then, the fiber plaque and consumable nickel anode are connected to the corresponding terminals of a d.c. power supply. The nickel or nickel coated fiber plaque is made cathiodic, at a high current density. The preferred current density value is 50 mA./sq.cm. of flat planar surface area, although the current density limits range from about 20 to 100 mA./cm$^2$.

It is not desirable, in this process, to pulse the current to the cathode. The current must be non-pulsed, continuous direct current to insure that a non-acidic environment is maintained at the plaque fiber surface, preventing corrosion and dissolution of the fibers. The continuous direct current is applied for between ½ and 4 hours, preferably between 1 and 3 hours. After 4 hours a saturation level is reached with respect to impregnation with Ni(OH)$_2$. It is important to operate within this high-current density range in the initial electro-precipitation. Below about 20 mA./cm$^2$, loading of the plaque with active material proceeds at such low rates that adequate filling of the plaque consumes an inordinate and wasteful amount of time. Above 100 mA./cm$^2$, the Ni(OH)$_2$ will precipitate superficially, and fail to load the plaque properly with active material.

During electro-precipitation, the localized catholyte within the porous nickel fiber plaque cathode, quickly changes from moderately acid, pH of between 2.0 and 2.8, to basic, pH of about 7.5, at which point Ni(OH)$_2$ can precipitate in-situ. In the electro-precipitation step, the H$^+$ ions are used in the reduction of NO$_3^-$ to NH$_3$ at the cathode or evolved as hydrogen gas at the cathode, and a concentration gradient of OH$^-$ ions starts an outward diffusion of OH$^-$ ions from the nickel fiber plaque. One of the purposes of the high current density used in the initial electro-precipitation in this invention is to build up the concentration of the OH$^-$ ions within the nickel fiber plaque pores faster than diffusion can remove them. When the solubilty product of Ni(OH)$_2$ is exceeded, the Ni(OH)$_2$ precipitates in-situ as desired. This precipitation serves to remove the OH$^-$ ions from solution, but this is compensated for by the continued application of continuous direct current.

Because of the high energy input to the cell, the I$^2$R energy will heat up the electrolyte, which is at an initial temperature of about 18° C. to 30° C. It is important to keep the electrolyte in the electro-precipitation cell below about 30° C. Above this value, efficiency drops off drastically and the pH value of catholyte within the nickel fiber plaque will be difficult to build up to a basic OH$^-$ precipitating concentration. Since OH$^-$ ion diffusion rate increases with temperature, it may be desirable to maintain the cell at initial temperature by means of cooling bath 3 shown in FIG. 1.

Nitric acid may be required in small amounts to maintain the pH of the electrolyte in the electro-precipitation cell. Nickel ions that are precipitated within the porous metallic fiber plaque are replaced by nickel ions from the consumable nickel anode. This is an important economic consideration, since nickel as sheet metal is about one-half the price of nickel in hydrated nickel nitrate form. Naturally, when the loaded plaques are removed from the electro-precipitation cell, some dragout of electrolyte occurs which is generally replaced in the electro-precipitation cell by electrolyte of similar composition and pH.

The nickel fiber plaque is made receptive to further loading by intermediate oxidative formation conditioning as shown in FIG. 2 of the drawings. This is an electrochemical oxidation of active material in caustic formation solution. This process expands the active material and releases the nitrate that has been trapped by the voluminous precipitate and which constitutes about 20 wt.% of the impregnated material after the first electro-precipitation. Generally, the loaded plaques are washed between the various electro-precipitation and formation conditioning steps.

During electrical charging, in the presence of alkali hydroxide solution, the following oxidation reaction occurs:

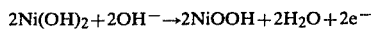

$$2Ni(OH)_2 + 2OH^- \rightarrow 2NiOOH + 2H_2O + 2e^-$$

Intermediate oxidation formation is carried out in a caustic formation bath such as at least one of NaOH, KOH or LiOH, preferably KOH having a small amount of LiOH present, for 0.5 to 12 hours. It has been found that oxidation formation, at 5% to 55% concentration for the alkali hydroxide, gives optimum current distribution in the nickel fiber electrode plaque and a minimal amount of active material loss. Best results accrue if two successive formation solution baths are used. A first formation bath or cell can be used as a sink to trap nitrate and NH$_3$. The plaque can be charged (oxidized) in the first cell, and again charged (oxidized) in the second cell or formation solution bath. Referring now to FIG. 2, the caustic hydroxide bath 21 contains a nickel dummy electrode 22 which is cathodic during charging and which is generally used on both sides of the loaded expansible nickel fiber plaque 23. Both are connected to respective terminals of a d.c. power supply.

The dummy cathode in the caustic formation bath is the site of the reduction of nitrate, trapped in the nickel fiber plaque pores, to ammonia. The ammonia, being only slightly soluble in caustic, is expelled as a gas. However, while the solution is being saturated with $NH_3$, some of the $NH_3$ reaches the NiOOH, metallic fiber anode by diffusion, where it is preferentially oxidized back to nitrate. This prevents a complete oxidation of the $Ni(OH)_2$ to NiOOH while any $NH_3$ is present in the cell. Thus it is expedient to use a current density of about 5 to 30 mA./sq.cm. which will reduce the nitrate at a rate fast enough that the zone around the dummy electrode is saturated with $NH_3$. This causes the $NH_3$ to be expelled before significant oxidation to nitrate at the anode can occur. No reduction formation is utilized in this process because it has been determined to be unnecessary; contributing no further improvement in the properties of the loaded plaque.

The oxidation formation is essential however, because it serves to expand the active material, causing intimate contact between the active material and the current-conducting fibers. The fiber surface also oxidizes, forming a semiconducting film of NiO which further attaches to the NiOOH active material, improving the electrical contact, so that subsequent electro-precipitation can be most efficiently conducted.

After the first oxidative formation conditioning in the alkaline hydroxide, the filled, nickel fiber electrode plaque is washed and reinserted into the nickel nitrate-cobalt nitrate solution for another cycle. This cycle is exactly similar to the first electro-precipitation, but at a lower, non-pulsed, continuous current application at a current density of between about 2.0 mA./sq.cm. and 10.0 mA./sq.cm., for between 4 and 40 hours, preferably between 14 and 24 hours to complete $Ni(OH)_2$ packing. Use of from about 2.0 mA./sq.cm. to 4.0 mA./sq.cm. in this step is the optimum for the particular fiber having an 85% to 90% porosity content. Finally, the oxidative formation is repeated as described hereinabove.

My process, shown in FIG. 3, calls preferably, for one cycle of the fiber plaque 30 in the high current density nitrate bath 31 at a total time of between 1 and 8 hours, one cycle in the low current density nitrate bath 32 at a total time of between 4 and 40 hours, and two cycles of formation conditioning 33 each at a time of 0.5 to 12 hours, or a combined total time of between 1 and 24 hours. The wash and optional dry steps 34 and 35 are also shown. The loaded plate will arrive at 36 after first passing through 32.

EXAMPLE I

A sintered, expansible, flexible, flat, nickel-plated steel fiber plaque, having fibers about 0.00046 to 0.00117 inch in diameter and about ⅛ inch in length was used in this process. The plaque density was about 10 percent of theoretical density, i.e. about 90% porous. The plaque size was approximately 16.5 cm. ×22.7 cm. ×0.22 cm., giving flat, planar, plaque surface areas of about 375 sq.cm. Its weight was approximately 90 grams. Two vertical grooves about 0.10 cm. deep were fabricated into the plaque to improve electrolyte availability, and nickel-plated steel lead tabs were attached by spot welding.

Seventy plaques, mounting on a long support, were simultaneously dipped slowly into a nickel nitrate-cobalt nitrate bath maintained at approximately 25° C. The electrolyte solution contained 999 pounds of $Ni(OH_3)_2.6H_2O$ and 52.5 pounds of $Co(NO_3)_2.6H_2O$ in 32 gallons of de-ionized water. This solution was 80% concentrated on a hydrated basis, and a specific gravity of about 1.59 and a pH of about 2.8.

Consumable, electrolytically deposited, nickel electrodes in parallel planes were placed four inches from each of the flat planar side of the plaques. These consumable electrodes were the anodes in the electro-precipitation cell. After a five minute maximum soak period the current was started. The total current was a continuous, non-pulsed 1,300 amps from a d.c. power supply, with the nickel fiber plaques connected to the negative terminal and the consumable nickel electrodes connected to the positive terminal. This gave a current density of approximately 50 mA./cm.$^2$ at the cathode. After 2 hours, the current was turned off.

The nickel fiber plaques, containing precipitate were removed and washed in hot water. The plaques were then drip-dried at about 25° for about 10 minutes. The plaques contained a deposition of bright green material identifiable as $Ni(OH)_2$ by leaching out the soluble phase (nickel nitrate trapped in the pores) and determining Ni content of the residue (active material). The percent Ni in the residue corresponds to that of the compound $Ni(OH)_2$.

The seventy plaques, again mounted on a long support, were then inserted into a first oxidative formation cell containing a solution of KOH having a specific gravity of 1.25, with 15 g./liter of LiOH added; with nickel dummy counter electrodes disposed between each flat side of the plaques. The expansible nickel fiber plaques were made anodic by connecting them to the positive terminal of the d.c. power supply with the dummy electrodes being negative. Charging was carried out at 590 amps total during a six hour period. This gave a current density of about 22 mA./sq.cm. at the anode.

This formation conditioning step is important to open up the plaque pores and compact the active material between the flexible nickel fibers so as to additionally load the plaque to the maximum limit. The electrode plaques were then washed in hot water, drip dried for about ½ hour maximum at 25° C., and reinserted into the nickel nitrate electrolyte salt solution of the electro-precipitation cell for another cycle exactly similar to the first electro-precipitation cycle described above, except that a much lower non-pulsed current density of about 3.0 mA./sq.cm. was used, for a period of 16 hours. This long, non-pulsed, continuous low current application completely packed the plaques with $Ni(OH)_2$. The loaded plaques were then oxidatively formed, as described above, but at 380 amps total, for another 20 hours in a solution of KOH having a specific gravity of 1.25, without reductive formation; to provide complete, activated, loaded electrode plates.

The loaded plates were then washed in hot water, drip dried at 25° C., weighed, and tested for electrical capacity. The capacity of all the plates was found to be about 27 Ah./plate or 0.072 Ah./sq.cm. (0.46 Ah./sq.in. or 7.2 Ah./sq. decimeter) of plaque for a plaque thickness of 0.25 cm. (2.5 mm.). The capacity/loading was about 0.14 Ah./g. of loaded plaque, or 0.25 Ah./g. of active material, indicating very high performance and usefulness as high power electrode plates. No corrosion was seen on any plate upon visual inspection.

I claim as my invention:

1. A method of loading porous, flexible, expansible metallic battery plaques with active material comprising the steps of:
   (a) immersing a porous, flexible, expansible metallic plaque and a consumable nickel electrode in an electrolyte solution comprising nickel nitrate having a pH of between 2.0 and 2.8, and then
   (b) making the plaque cathodic and the consumable nickel electrode aniodic and supplying sufficient continuous, non-pulsed current to the plaque to provide a current density of between about 20 mA./sq.cm. and 100 mA./sq.cm., to precipitate active material comprising bivalent nickel hydroxide within the plaque pores, and then
   (c) electrochemically oxidizing the active material in alkaline hydroxide formation solution, and then
   (d) immersing the plaque containing oxidized active material and a consumable nickel electrode in an electrolyte solution comprising nickel nitrate having a pH of between 2.0 and 2.8, and then
   (e) making the plaque cathodic and the consumable nickel electrode anodic and supplying sufficient continuous, non-pulsed current to the plaque to provide a current density of between about 2 mA./sq.cm. and 10 mA./sq.cm., to precipitate additional active material comprising bivalent nickel hydroxide within the plaque pores.

2. The method of claim 1, wherein the current is supplied in step (b) for a time of between ½ hour and 4 hours and the current is supplied in step (e) for a time of between 4 hours and 40 hours.

3. The method of claim 1, wherein the nickel nitrate electrolyte solution in steps (a) and (d) has a concentration of between about 50% and about 83%.

4. The method of claim 1, wherein the plaque is washed between steps (b) and (c) and between steps (c) and (d).

5. The method of claim 1, wherein the plaque comprises metallurgically bonded, metallic fibers, said plaque having a density of between 5% and 25% of theoretical density.

6. The method of claim 1, wherein the electrolyte solution comprising nickel nitrate is at a temperature below about 30° C.

7. The method of claim 1, wherein the electrolyte solution in steps (a) and (d) also contains minor amounts of cobalt nitrate, and where cobalt hydroxide is also precipitated in steps (b) and (e).

8. The method of claim 1, wherein the plaque is flat, and the fibers are between about 0.0002 inch and 0.003 inch in diameter.

9. The method of claim 1, wherein the alkaline formation solution of step (c) is a 5% to 35% concentrated solution selected from the group consisting of KOH, NaOH, LiOH, and mixtures thereof.

10. The method of claim 1, wherein the electrochemical oxidation of step (c) is carried out at a current density of about 5 mA./sq.cm. to 30 mA./sq.cm. to expand the metallic plaque and open pores within the plaque, and where step (c) is repeated after step (e).

* * * * *